United States Patent
Hoffmeister

(10) Patent No.: US 12,346,849 B2
(45) Date of Patent: Jul. 1, 2025

(54) SYSTEM FOR SUPPORTING TEAMWORK BY MEANS OF AUGMENTED REALITY

(71) Applicant: BioNTech SE, Mainz (DE)

(72) Inventor: Robert Hoffmeister, Grunwald (DE)

(73) Assignee: BIONTECH SE, Mainz (DE)

( * ) Notice: Subject to any disclaimer, the term of this patent is extended or adjusted under 35 U.S.C. 154(b) by 1389 days.

(21) Appl. No.: 16/607,054

(22) PCT Filed: Apr. 20, 2018

(86) PCT No.: PCT/EP2018/060150
§ 371 (c)(1),
(2) Date: Mar. 31, 2020

(87) PCT Pub. No.: WO2018/197349
PCT Pub. Date: Nov. 1, 2018

(65) Prior Publication Data
US 2023/0196223 A1    Jun. 22, 2023

(30) Foreign Application Priority Data
Apr. 23, 2017  (DE) .................. 102017108622.6

(51) Int. Cl.
*G06Q 10/06*  (2023.01)
*G06Q 10/0631*  (2023.01)
(Continued)

(52) U.S. Cl.
CPC ...... *G06Q 10/06311* (2013.01); *G06T 19/006* (2013.01); *H04W 4/02* (2013.01)

(58) Field of Classification Search
CPC .................................................. G06Q 10/06
See application file for complete search history.

(56) References Cited

U.S. PATENT DOCUMENTS

| | | | |
|---|---|---|---|
| 2004/0183751 A1* | 9/2004 | Dempski | G02B 27/017 345/8 |
| 2012/0215580 A1* | 8/2012 | Barney | G06Q 10/00 705/7.16 |

(Continued)

FOREIGN PATENT DOCUMENTS

| | | |
|---|---|---|
| CN | 104111812 A | 10/2014 |
| CN | 204406329 U | 6/2015 |

(Continued)

OTHER PUBLICATIONS

PCT International Search Report and Written Opinion, PCT/EP2018/060150, Jun. 1, 2018, 17 pages.

*Primary Examiner* — Nga B Nguyen
(74) *Attorney, Agent, or Firm* — QUARLES & BRADY LLP

(57) ABSTRACT

The invention relates to a computer-aided system for supporting teamwork by means of augmented reality (AR). According to one embodiment, the system comprises a production server, which is designed to store the three-dimensional geometry of at least part of a machine and a plurality of tasks. A spatial position in which the task should be performed and position-related information concerning the performance of the task are associated with each task. The system also comprises a plurality of user terminals, which are connected to the production server by means of a computer network, each user terminal being assigned to a person of a team. The production server is also designed to assign each person of the team a certain task, the position-related information associated with the task in question being displayed on the user terminal of the person in question.

17 Claims, 6 Drawing Sheets

(51) Int. Cl.
  *G06T 19/00*   (2011.01)
  *H04W 4/02*    (2018.01)

(56) References Cited

U.S. PATENT DOCUMENTS

| | | | |
|---|---|---|---|
| 2013/0278635 A1* | 10/2013 | Maggiore | G06F 3/0304 |
| | | | 345/633 |
| 2013/0340390 A1* | 12/2013 | Carson | G07F 17/0092 |
| | | | 53/473 |
| 2014/0136255 A1* | 5/2014 | Grabovski | G06Q 10/063114 |
| | | | 705/7.14 |
| 2014/0204121 A1 | 7/2014 | Whitley et al. | |
| 2014/0240349 A1 | 8/2014 | Tuukkanen | |
| 2014/0278638 A1* | 9/2014 | Kreuzkamp | G06Q 10/06398 |
| | | | 705/7.15 |
| 2014/0298227 A1* | 10/2014 | Gass | G06Q 50/04 |
| | | | 715/771 |
| 2015/0199641 A1* | 7/2015 | Napoli | G06Q 10/063114 |
| | | | 705/7.15 |
| 2015/0379457 A1* | 12/2015 | Jackson | G06Q 10/06398 |
| | | | 705/7.17 |
| 2016/0049006 A1 | 2/2016 | Mullins et al. | |
| 2017/0061212 A1 | 3/2017 | Tanaka et al. | |
| 2017/0200108 A1* | 7/2017 | Au | G06Q 10/06398 |
| 2017/0277166 A1* | 9/2017 | Popa-Simil | G05B 19/4184 |
| 2017/0361461 A1* | 12/2017 | Tan | B25J 19/021 |
| 2018/0005442 A1* | 1/2018 | Mullins | G06T 19/006 |
| 2018/0096588 A1* | 4/2018 | Shabah | G06Q 50/265 |
| 2018/0164775 A1* | 6/2018 | Crivella | B25J 9/1687 |

FOREIGN PATENT DOCUMENTS

| | | |
|---|---|---|
| DE | 10215885 A1 | 10/2003 |
| DE | 102014103538 A1 | 9/2014 |
| EP | 1295099 B1 | 9/2011 |
| EP | 3076253 A1 | 10/2016 |
| EP | 3086193 A1 | 10/2016 |
| EP | 2203878 B1 | 9/2017 |
| JP | 2011248860 A | 12/2011 |
| JP | 2014215646 A | 11/2014 |
| JP | 2017049774 A | 3/2017 |

* cited by examiner (A)          (B)

SYSTEM FOR SUPPORTING TEAMWORK BY MEANS OF AUGMENTED REALITY

CROSS-REFERENCE TO RELATED APPLICATIONS

This application represents the national stage entry of International Application PCT/EP2018/060150, filed Apr. 20, 2018, which claims the benefit of German Application 102017108622.6, filed Apr. 23, 2017. The contents of both applications are hereby incorporated by reference as set forth in their entirety herein.

TECHNICAL FIELD

The present description relates to a system and a method for dynamically supporting a team of machine operators (e.g. for setting up or retooling) by means of augmented reality (AR) systems.

BACKGROUND ART

Augmented reality—also known as mixed reality or holographic computing—can be understood as an overlay of real environment and virtual elements. Such a superposition is possible e.g. by means of a stereoscopic head-up display (HUD). Such displays can be worn like spectacles, with the two lenses serving as transparent head-up displays that allow stereoscopic (3D) imaging of elements in the display's field of view, and are therefore referred to as AR glasses. A commercially available system with head-up display and integrated processor (CPU) and graphics processor (GPU) and sensors to determine the position of the AR glasses in space is e.g. the HoloLens® from Microsoft. Such devices are referred to in the following as AR terminals.

The use of AR systems in production and service is known per se—for example in the automotive industry (see e.g. EP 1 295 099 B1). AR systems can, for example, support an inspector in quality control. The AR system can display information to the user (e.g. the inspector during quality control) in his field of view and thus expand his perception. In particular, image, video or text data can be displayed as information. By superimposing virtual and real environments, the user has the option of carrying out target/actual comparisons easily.

The inventors have set themselves the object of improving the use of the potential of modern AR systems in production, for example in situations where several people have to carry out a process on a machine together (as a team), generating work instructions dynamically and adapting them in a step-by-step and dynamic manner.

SUMMARY

The above object is solved by the system set out in claim 1 and the method set out in claim 17. Various embodiments and further developments are the subject of the dependent claims.

A computer-based system for supporting teamwork using Augmented Reality (AR) is described. According to an example, the system comprises a production server configured to store: the three-dimensional geometry of at least a part of a machine and a plurality of tasks, each task being associated with a position in space at which the respective task is to be executed, and positional information relating to the execution of the task. The system also comprises a large number of user terminals connected to the production server via a computer network, with each user terminal assigned to one person in a team. The production server is further trained to assign a task to each person in the team, with the position-related information assigned to that task displayed on the user terminal of that person.

Furthermore, a computer-assisted method to support teamwork is described. According to an exemplary embodiment, the method comprises storing the following data on a production server: the three-dimensional geometry of at least one part of a machine and a plurality of tasks, each task being associated with a position in space at which the respective task is to be executed and position-related information regarding the execution of the task. The method also involves the log-in to the production server of a large number of user terminals connected to the production server via a computer network. Each user terminal is assigned to a person in a team. The method also includes assigning a task from the plurality of tasks to each person in the team, whereby the position-related information assigned to the respective task is displayed on the user terminal of the respective person.

In an exemplary embodiment, the respective user terminal can display the position-related information assigned to the respective task at the position assigned to the task in the space (e.g. using augmented reality technology). A person can also be assigned to a group of tasks (from the plurality of tasks), with the user terminal allowing the person to select a task from the group of tasks. Then the user terminal of the respective person can display the position-related information assigned to a task selected by the person.

The assignment of a task or group of tasks to a person (to whom a user terminal is assigned) can be performed dynamically and may be adapted to the respective process to be performed by the team. The assignment of tasks can be dynamically updated as the number of participating user terminals changes and the assignment of tasks can depend on a skill level of a person representing the powers or abilities of that person.

BRIEF DESCRIPTION OF THE DRAWINGS

The invention is explained in more detail below using the examples shown in the drawings. The depictions are not necessarily true to scale and the invention is not limited to the aspects depicted. Rather, emphasis is placed on presenting the principles underlying the invention.

DETAILED DESCRIPTION

Figure 1:
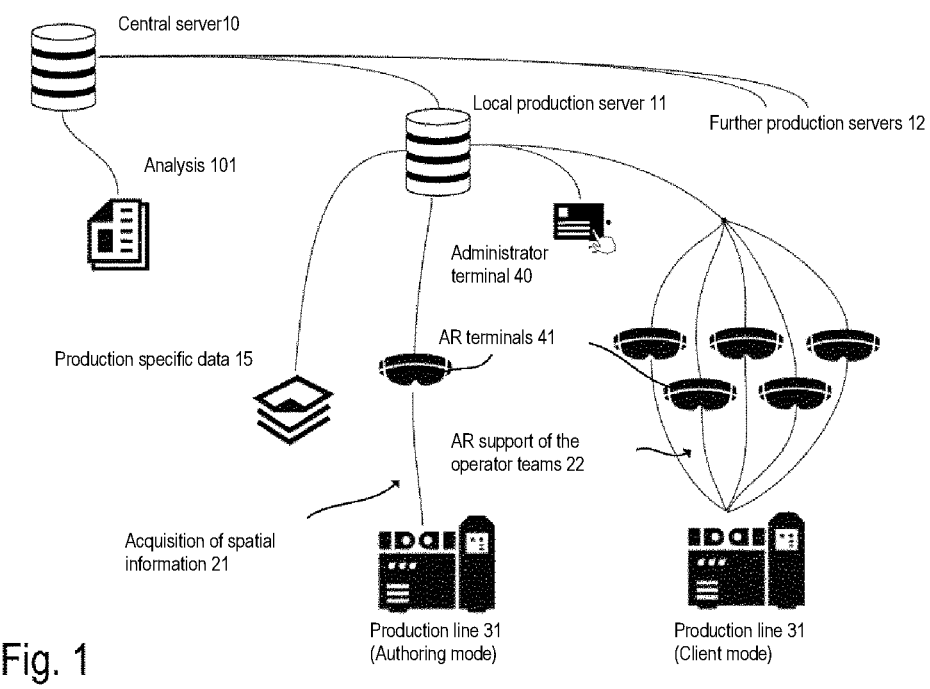
FIG. 1 schematically illustrates an example of a system to support a team of (any number of) operators by means of networked AR terminals.

FIG. 1 schematically shows a first example of a system to support a team of operators in operating production machines using networked terminals such as augmented reality terminals (also called AR terminals). The process carried out by the team can be, for example, the setup or retooling of one or more machines of a production line. In many fields of industry, for example, packaging machines often have to be retoolted in order to produce packaged products with different package sizes or with different variants of packaging. One example of this is the automated packaging of pharmaceuticals, in which a large number of different types of packaging are required for many different countries and products. Regular retooling of the packaging machines is necessary and the efficiency of this retooling process can be an important factor.

In the example shown, the system can be operated in two operating modes. The first operating mode is called authoring mode and the second operating mode is called client mode. The system comprises one or more production servers 11, 12, etc. (e.g. one server for each production line), which can be connected to a central server 10 in a computer network. For smaller production facilities, the functions of the central server and the production server 11 can be concentrated in one (production) server. In this example, production server 11 is assigned to production line 31. A plurality of user terminals such as AR terminals 41 and (optionally) an administrator terminal 40 (e.g. a personal computer, a tablet PC or another AR terminal) can be connected to the production server 11 via the computer network, for example via a wireless local area network (WLAN). The production servers 11, 12 do not have to run on independent (computer) hardware, but the respective server services can also be executed in a user terminal (e.g. an AR terminal or another mobile device) or the administrator terminal 40.

AR terminals can be stereoscopic head-up displays (HUDs or HMDs, head-mounted displays) with or without sensors for spatial detection of the environment. Commercially available systems are e.g. Google Glass®, Epson Moverio® (without sensors for spatial detection of the environment) and Microsoft HoloLens® (with sensors for spatial detection of the environment). However, conventional mobile terminals such as a tablet PC with a built-in camera can also be used as AR terminals. The built-in camera can then be used to read in so-called AR markers (marker-based augmented reality), which can be arranged at certain positions on a production line. If the AR device detects an AR marker (e.g. a bar code or a QR code), information belonging to the respective position can be displayed on the AR terminal. HUDs or HMDs have the advantage that the respective person has his hands free to carry out the necessary work at the respective position. In addition, conventional mobile devices such as a tablet PC with a built-in camera (but often not referred to as AR terminals) can also be used. They can then work with text or audio instructions, for example.

The local production server 11 for production line 31 stores production-specific data (FIG. 1, reference number 15) in relation to production line 31 and can dynamically make it available to the AR terminals 41 and the administrator terminal 40 as required. This does not happen once at the beginning of a process, but can be adapted to the current situation by keeping pace with the process. Adjustments can or must be made, for example, if one or more operators leave the system during the process (by logging out) or come in again (by logging on). The system (using computer algorithms) must then dynamically create an updated list of tasks for each operator, e.g. taking into account a "skill level" of the operator, and make this list available to the respective operator. This also happens—for each task—after the completion of a task by an operator. Thus it is ensured that all tasks are executed, no task is assigned several times and each operator is offered only tasks which are admissible in view of their operator status. "Offers" in this context means that an operator is offered not only a specific task, but also a selection of clusters and tasks (group of tasks), depending on their skill level (e.g. the skill level "professional"), e.g. taking into account the positions of the other operators. An operator can thus (within certain limits) select which concrete task he/she will perform next.

The assignments of the skill levels of the respective operators can be stored e.g. in a database of the production server 11 or the central server. For example, an operator can use a code or password to authenticate himself/herself at a user terminal and the system can thus identify the users using the networked user terminals at which the users are "logged on".

The central server 10 has access to the production-specific data of several (or all) production lines and can update them regularly. It can be further trained to carry out (e.g. comparative) data analyses (FIG. 1, reference number 101). The central server 10 can be connected to the local production server 11 via the local computer network. If the central server 10 is located at a different location, it can also be connected to the local production server 11 via the public Internet (e.g. via a virtual private network, VPN). The data analyses mentioned can include e.g. real-time analyses (Realtime Analytics), benchmarking methods and the like.

Figure 2:
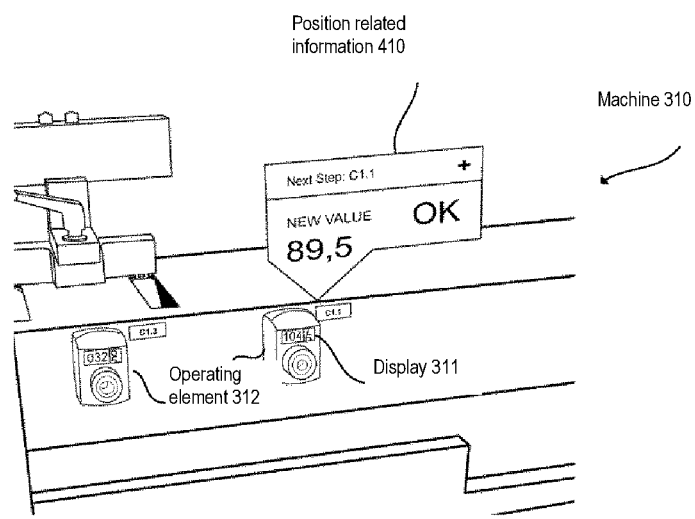
FIG. 2 is an exemplary depiction of a machine with position- and context-related depiction of information to an operating or display element of the machine.
Figure 3:
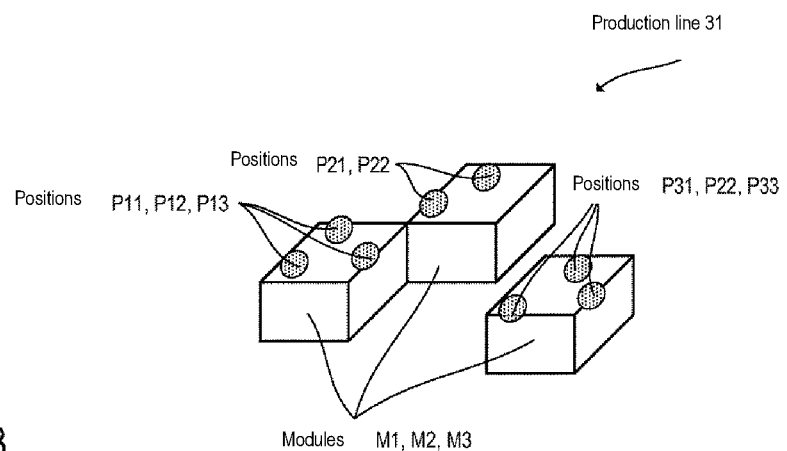
FIG. 3 shows a schematic outline drawing of the subdivision of a production line into several plant modules and several positions at which tasks are to be executed.

Production line 31 comprises at least one machine 310 with several operating elements 312 and/or displays 311 (see also FIG. 2). In this example, the controls 312 have displays 311. As AR terminals, AR terminals with sensors can be used for spatial detection of the environment. This enables markerless augmented reality (AR) and precise tracking of the position of the respective AR terminals. In the authoring mode, at least one AR terminal 41 and the sensors contained therein (and the software listed on the terminal) capture the geometry of the environment (and thus of the machine 310) three-dimensionally and a corresponding 3D model is created and stored in the local production server 11. In this process, various sensors and e.g. algorithms for simultaneous localization and (3D) mapping (Simultaneous Localization and Mapping, SLAM) are used. Suitable sensors include cameras, TOF cameras (time-of-flight cameras), inertial measurement units (IMUs), etc. The methods and algorithms for data acquisition and the construction of a 3D model are well known and are supported by commercially available devices such as HoloLens® from Microsoft, Tango from Google, Intel RealSense™, etc.

FIG. 2 schematically illustrates a part of a 3D model of machine 310, whereby two operating elements 312 with displays 311 are shown as examples. The operating elements can generally be referred to as the human-machine interface (HMI). In the authoring mode, further positions (e.g. in the form of coordinates) in the space can be defined, at which position-related information 410 concerning the task to be performed at the respective position can be dynamically assigned and displayed later in the client mode. The position-related information 410 can thus represent a task in a form perceptible to a human being (e.g. text, numerical values, graphics, etc.). For example, a position can be "marked" next to each human-machine interface (operating element 312/display 311), at which information on the respective human-machine interface can be displayed in client mode. This position-related information can be superimposed by the AR terminals 41 of the real environment. In this example, a special marking (e.g. with a QR code) of the item is not necessary. With so-called markerless AR systems, the desired position is recognized based on current sensor information provided by the AR terminal and a previously created (or otherwise provided) 3D model of the environment. However, markers can also be used in simpler systems. In another example, markerless and marker-based AR terminals and non-AR terminals can be combined in one system. It should be noted that the control elements 312 with displays 311 are only an example of positions on the machine where tasks can be executed. Other examples are the installation or mounting of machine parts, the replacement of wearing parts, etc.

The position related information 410 at the point in the space previously defined in authoring mode is shown in the example of FIG. 2 in client mode to the operator carrying an AR terminal displays. In this example, the position-related information 410 is displayed at a point which is located in the immediate vicinity of the operating element 312 (labeled "C1.1"). The information 410 is displayed by the AR terminal of the respective operator as soon as the corresponding point in the space is in the field of view of the AR terminal 41, which in turn depends on the position (location and orientation) of the AR terminal 41 in the space. Information 410 can refer to a task to be executed by the operator at the respective position (e.g. at the location of the operating element C1.1, see FIG. 2). This means that each task is assigned a specific position in the space.

The information 410 displayed at a certain position can, for example, be a numerical value which the operator is to set on the operating element 312 and/or check on the associated display 311. When the operator has completed the task, i.e. set the desired value on the control element 312 (or checked the set value), he/she can, for example, confirm the completion of the task with a gesture in the field of view of the AR-terminal 41 and complete the current work step (FIG. 2, step C1.1). The AR-Terminal 41 then offers the operator several locations (positions in the space) for selection or a specific location (if only one is available for selection) and leads the operator to the location where the next task, i.e. the next work step (e.g. the next control element/the next HMI) is to be performed. When a task is completed, its successful completion can also be verified and documented, e.g. by taking photographs of the control element 312 or display element 311 using the AR terminal. For analysis purposes (see FIG. 1, Analyses 101), additional data can also be collected, such as the name, time or duration required by a person for a particular task. The time data can be stored in the production server in person-related or anonymous form. In the pharmaceutical sector, for example, the collection of personal data may even be mandatory with regard to safety audits (GMP, Good Manufacturing Practice). In this step, the system can enter the tasks that have already been completed and will not offer or assign them to another operator during the dynamic creation of the task lists.

FIGS. 1 and 2 show the structure of the overall system and the view of an operator through an AR terminal 41. The following FIGS. 3-9 illustrate the functionality of the system, wherein the individual functions may be partially implemented in the production server 11 and partially in the AR terminals 41 or the administrator terminal 40. As already explained above, in the authoring module, one or more system modules of a production line 31 (see FIG. 1) are geometrically recorded and several positions or areas (spots) are defined at which a team of operators has to perform a number of tasks. In the schematic depiction according to FIG. 3, these positions are designated P11, P12, P13, P21, etc., which form the set of all possible positions. In this example, certain work areas in a production line (e.g. different parts of a machine 310) are defined as plant modules, and each defined position can be assigned to a module. A (plant) module corresponds to a machine or part of a machine in the respective production line. In the diagram shown in FIG. 3, production line 31 (or part of it) is divided into three modules M1, M2 and M3. Module M1 comprises the positions P11, P12, and P13, module M2 comprises the positions P21 and P22, and module M3 comprises the positions P31, P32, and P33. Each of the positions P11, P12, P13, P21, P22, P31, P32, and P33 can, if necessary in the process under consideration, be dynamically assigned a certain task when creating the work document for the respective process (e.g. the retooling of a machine), which must be performed by an operator of the team. The assignment of positions to modules is not mandatory and can depend on the specific conditions of the production line and the exact requirements of the product processed (e.g. packaged) during a particular pass on the production line. Each of the positions P11, P12, P13, P21, P22, P31, P32, and P33 can be defined e.g. by three space coordinates. Each position can also be assigned an orientation (for the purpose of 3D representation of the position-related information assigned to a position for the task to be performed at that position).

Figure 4:
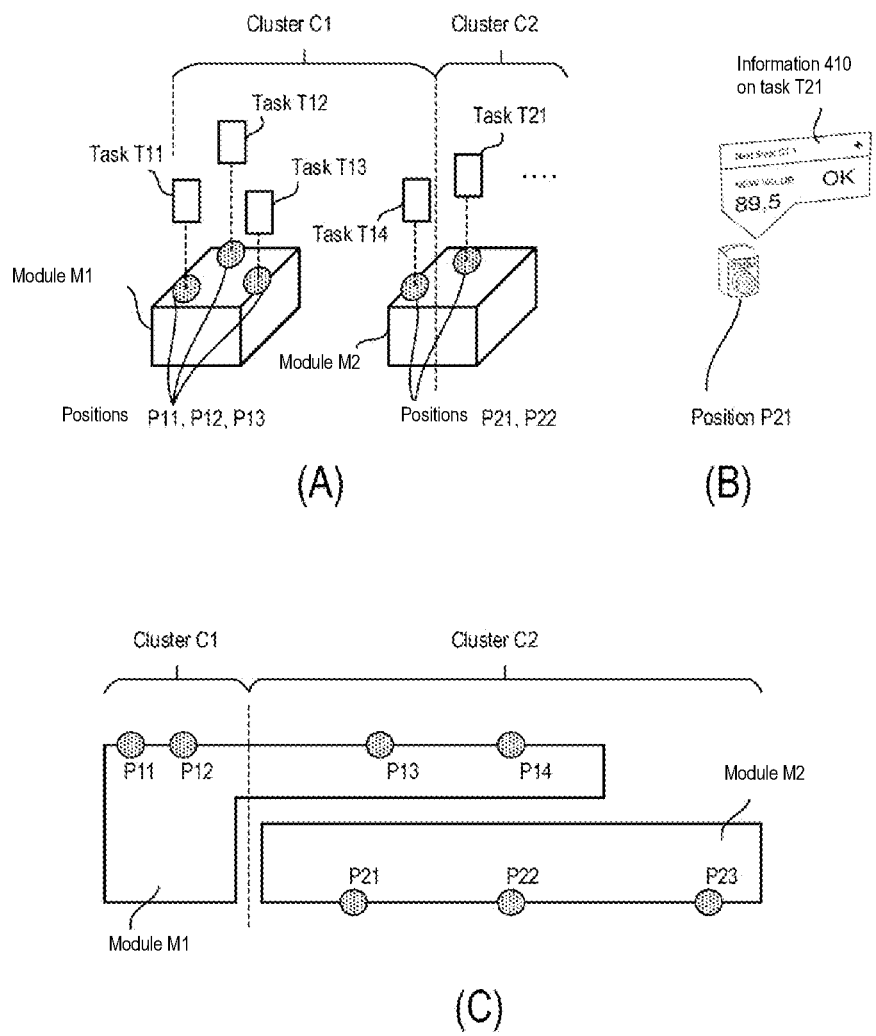
FIG. 4 shows a schematic outline drawing of the sum of all possible tasks (tasks T11, T21 . . . ) required for the dynamic generation of a process with the assignment of individual tasks to associated positions on the production line.

Diagram A from FIG. 4 shows the assignment of tasks to positions P11, P12, P13, P21, P22, P31, P32, and P33. The individual tasks can be clustered to C1, C2, etc. (groups), whereby the tasks assigned to a particular cluster can, for example, depend on one another (and must therefore, for example, be processed one after the other). In addition, tasks that have to be performed at positions that are very close to each other can be assigned to a cluster. A cluster can—but does not have to—include those tasks that are assigned to the positions of a module. In the example from FIG. 4 (diagram A), tasks T11, T12, and T13 are assigned to positions P11, P12, and P13 in module M1; tasks T14 and T21 are assigned to positions P21 and P22 in module M2. Apparently, the amount of tasks of a module is not equal to the amount of tasks of a cluster. In this example, tasks T11, T12, T13, and T14 are assigned to cluster CL1 and task T21 (along with other tasks) to cluster CL2. As already mentioned, modules represent a certain area or part (the three-dimensional geometry) of a machine in a production line, whereas clusters group the tasks according to their logical sequence or togetherness. Diagram B from FIG. 4 shows a detail from FIG. 2. Position P21 indicates the location of the operating element and the information 410 shown relates to the task assigned to position P21. As mentioned above, there is no one-to-one assignment between plant modules and clusters. For example, as shown in diagram C of FIG. 4, two system modules M1 and M2 can also be partially arranged one above the other. Due to the close proximity, it can make sense to have the tasks at positions P21 and P13, P22 and P14 as well as P23 executed one after the other by the same person (or the same persons). In this case, the right part of module M1 above module M2 is assigned to the same cluster C2 as module M2. Only the left part of the module M1 is assigned to the cluster C1. The assignment between the tasks T11, T12, T13, and T14 and the positions P11, P12, P13, P21 and the corresponding position-related information can, for example, be stored in a database of production server 11 of the respective production line.

Figure 5:
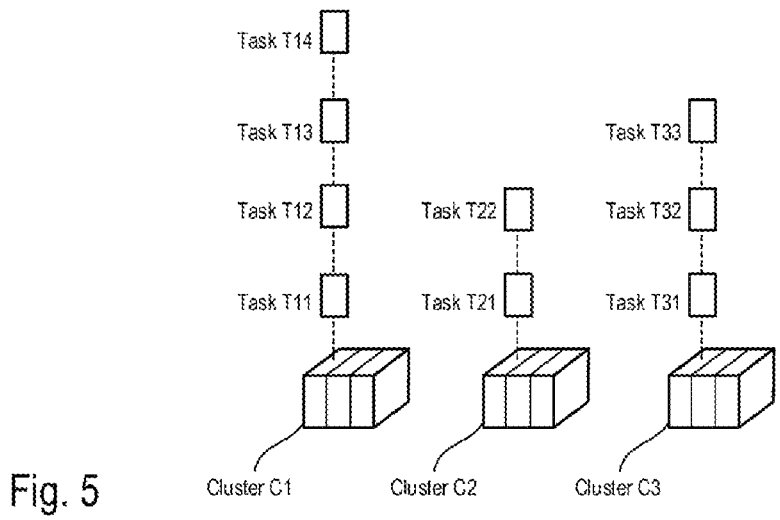
FIG. 5 shows a schematic outline drawing of the assignment of tasks to different task clusters.

FIG. 5 shows an example of a system description by means of clusters and the distribution of tasks across several clusters. In this example, four tasks are assigned to the first cluster CL1 (T11, 112, 113, T14), two tasks to the second cluster (T21, T22) and three tasks to the third cluster (T31, T32, T33). The overall system (in relation to a production line 31) can essentially be defined by three dynamically managed lists (see FIG. 6), namely a list L1 of uncompleted tasks not yet assigned to an operator of a team, a list L2 "active" tasks assigned to an operator, and a list L3 of completed tasks. The list L1 is a task list generated dynamically at the beginning of the process depending on the process result to be achieved (process parameters necessary to achieve the desired result) and variable framework conditions (e.g. number and skill level of operators), which can also be automatically adjusted during the process. The list L1 can also be dependent on process parameters of a previously executed process. For example, certain tasks can be omitted if the relevant settings/configurations on the production line have already been made for the previous process and do not need to be changed for the current process.

The lists L1, L2, L3 can also be stored in a database of the production server 11 and managed dynamically by it. Dynamic in this context means that the list of tasks to be completed and the assignment of tasks to the operators of a team are not created statically at the beginning of the process (i.e. before the operators start work), but can be changed/adjusted during the execution of the work. The number of operators of the team can change during the process (while the team is executing the process), the skill levels of the operators in the team can change (e.g. if an operator with the skill level "Trainee" is replaced by an operator with the skill level "Beginner"). This dynamics, which would be impossible with "manual" planning, can significantly improve the efficiency of process execution.

Figure 6:
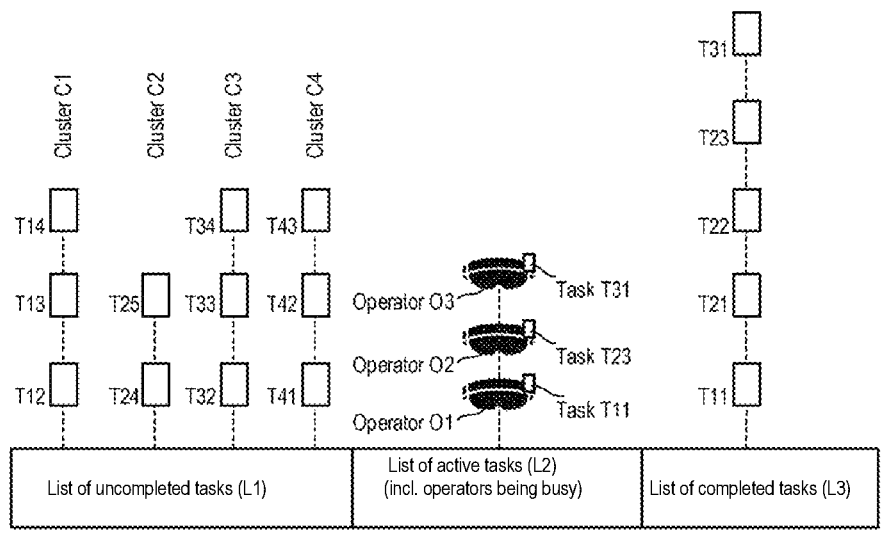
FIG. 6 is a diagram illustrating the automated organization of the activity of a team of operators during the execution of tasks.

FIG. 6 illustrates by way of example the description of a production line with eleven uncompleted tasks (list L1: tasks T12, T13, and T14 from cluster C1, tasks T24 and T25 from cluster C2, tasks T32, T33, and T34 from cluster C3, and tasks T41, T42, and T43 from cluster C4), three active tasks (list L2: tasks/operator T11/O1, T23/O2 and task T31/O3) and five completed tasks (list L3: tasks T11, T21, T22, T23, and T31). The operators O1, O2, and O3 can be distinguished by the AR terminals they use. It should be mentioned again that the list L1 of the pending tasks is not a fixed list, but that this can be created dynamically at the beginning of the process. A number of factors influence the creation of the list. At the beginning of a process e.g. an operator (e.g. with skill level "Supervisor") can decide whether or not to take account of settings known from the previous process on the production line when compiling list L1 of the tasks to be executed. Based on the list L1 thus generated, the lists L2 (active tasks) are created dynamically for each operator O1, O2, etc. This takes into account whether a task T1, T2, etc. can be assigned to an operator O1, O2, etc., i.e. whether he/she is authorized to perform certain tasks and whether these tasks are assigned to him/her as the list L1 for selection or in a fixed, dynamically generated sequence.

It should be noted at this point that, for example, when retooling a production line (retooling process), not all possible settings/adjustments on the production line must always be carried out/checked. In some situations this is desirable. However, it may be more efficient to carry out/check settings/adjustments on the production line during the retooling process only at each position of the production line where the desired settings/adjustments differ from the last retooling process.

Each AR terminal has a unique identifier, for example the MAC address (Media Access Control address) of the respective AR terminal in the computer network. However, any other unique identifier can be used to identify an operator's AR terminal. Personal data and/or data relating to the performance of the tasks (times determined, documentation, etc.) of the respective operators may be linked to the identifier.

In many production plants, machines have to be operated by several people (referred to here as operators) who have to work as a team (for example, when retooling a machine for production or packaging or handling another product). The members of a team must be well attuned to each other in order to work together efficiently. In practice, for each machine (or for a group of machines on a production line), schedules (e.g. in paper form) are created for the people in a team, and each team member works through his schedule. The team size is fixed for a certain process (e.g. the retooling of a machine) and cannot easily be changed after the start of work. The flow charts are static. If a team member fails (or a shift change is taking place), the whole process can be delayed considerably. Even by adding another person to a team, the whole process (the sum of the tasks) cannot be accelerated significantly, as this would disrupt the workflow.

Figure 7:
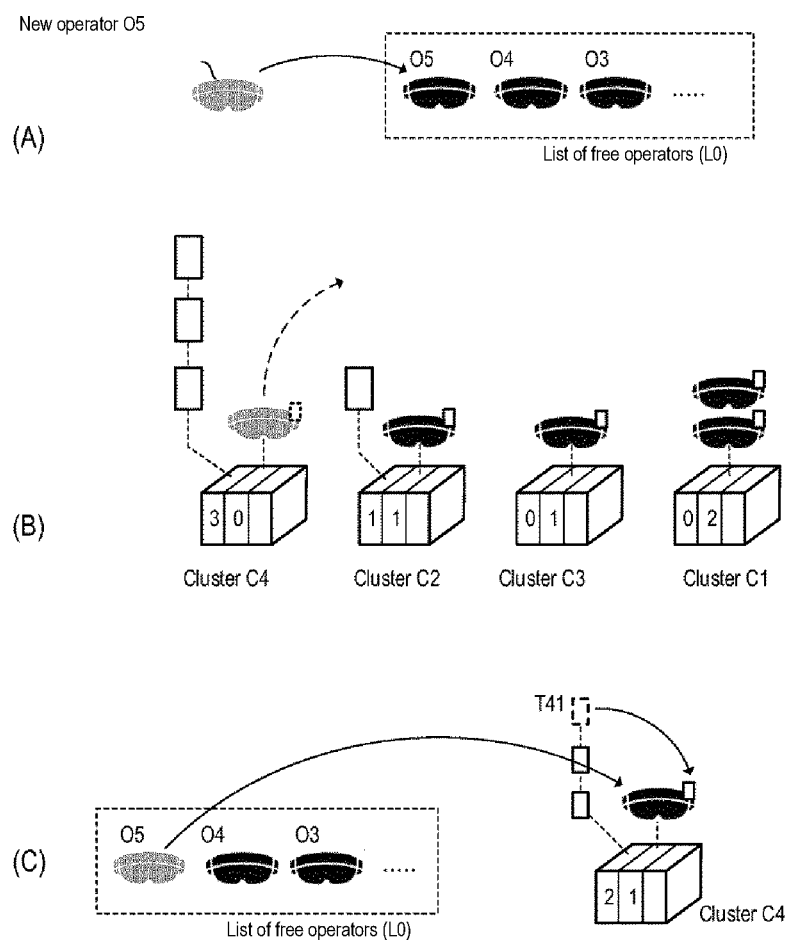
FIG. 7 illustrates the procedure for assigning a task to an operator who has just joined a team using three schematic diagrams (a-c).

The system described here allows flexible adjustment of team sizes using AR terminals (see FIG. 1) used by the team members (the operators). In the following a method is described, which makes it possible to dynamically adjust the size of a team of e.g. differently trained operators (i.e. with different skill levels e.g. "Trainee", "Beginner", "Advanced", "Professional", "Supervisor", etc.) and operators equipped with different terminals and also the associated assignment of tasks to the team members dynamically with the help of the networked AR terminals. The example from FIG. 7 shows a situation in which the team is extended by an operator (Operator O5) (a new person joins the team). This registration can be done automatically (e.g. after connecting the operator O5's AR terminal to a specific WLAN access point) or manually (e.g. by entering a password) by the operator O5 (e.g. with his AR terminal 41 or an administrator terminal 40). After registration, Operator O5 will be added to the list of free operators (L0) as a free operator and optionally (taking into account the skill level) (i.e. those operators/team members who have not yet been assigned or offered a task). This situation is shown in diagram A from FIG. 7.

Diagram B from FIG. 7 illustrates how a decision can be made automatically which uncompleted task (from one of the clusters) is assigned to which free operator. An operator with a low skill level (e.g. "beginner") can be dynamically assigned a task list by the system, which he/she must process in a predefined order. The system will also not assign tasks that have already been completed or tasks that are unsuitable for the skill level of the operator. In addition, the system can assign tasks to the ("beginner") operator that are to be performed on as free a part of the production line as possible. For this purpose, the system can use a suitable algorithm to determine the best starting position of a "beginner" operator and initially generate a list of tasks that are offered to him/her in step with the constantly changing situation during the process. In a situation where an operator with a higher skill level (e.g. "professional"), who can choose from a plurality of clusters and tasks offered by the system, anticipates a "beginner" operator and "stands in his way" (which prevents the "beginner" operator from executing a certain task), the system can dynamically generate a new (e.g. optimized according to certain criteria) task list for the "beginner" operator (autopilot mode). This process runs constantly and in step with the process in the background and ensures optimum distribution of operators on the production line. Depending on the skill level of an operator, only one task at a time can be assigned to the operator or a group of tasks from which the operator can choose (via his user terminal). When an operator has confirmed a certain task (by means of his user terminal), the user terminal can virtually display the associated (position-related) information at the position in the space assigned to the respective task, which is to support or guide the operator in the execution of the task.

In the example shown in FIG. 7, Diagram B, the clusters are sorted in descending order according to the number of uncompleted tasks (first criterion). As a second criterion for dynamic generation, the number of active tasks (with ascending sorting) can be used. This means that a free operator (here operator O5) (e.g. with skill level "Beginner") is assigned a task from the cluster that contains the most uncompleted tasks. If this selection criterion does not lead to a unique result (e.g. because the number of uncompleted tasks is the same for two clusters), operator O5 is assigned a task from the cluster that contains the most uncompleted tasks and the least active tasks. Further selection criteria can be taken into account alternatively or additionally. For example, the current location of all operators known to the system (and regularly updated) can be taken into account as a criterion by assigning or offering one or more tasks to the (free) operator closest to the position assigned to the task. This approach makes it possible to shorten the paths of the operators. It is also possible to avoid certain assignments between task and operator, for example if a certain assignment would lead to too many operators being in a certain spatial area at the same time. As mentioned above, the position of the individual operators can be tracked with the help of AR terminals 41, for example, and this information can also be taken into account in the dynamic adjustment of task lists L1-L3. It goes without saying that for small production lines (e.g. only a single machine) it is not necessary to group the tasks in clusters. As criteria for the assignment of the tasks to operators, the resulting paths of the operators or similar can be used. Even a random assignment would be possible if the application allows it.

In this example, cluster C4 contains three uncompleted tasks and no active task (e.g. because a task has just been completed, see also FIG. 8), cluster C2 contains one uncompleted task and one active task, cluster C3 contains no uncompleted task and one active task and cluster C1 contains no uncompleted task and two active tasks. Consequently, the free operator O5 is offered—among other things—a task (e.g. task T41) from cluster C4. This assignment is shown schematically in diagram C from FIG. 7. The task is deleted from the list L1 of uncompleted tasks and added to the list L2 of active tasks. Operator O5 is deleted from the list L0 of free operators (see FIG. 6). Within the clusters, the order of the tasks can be fixed. The order is determined in authoring mode if there is a necessary order (e.g. first remove a part, then install a new one). If a fixed sequence of tasks (or a subset of tasks) is not specified by the production line, they can be selected according to certain selection criteria (e.g. in such a way that spatial overlaps of the work areas (i.e. collisions) of the operators at the positions assigned to the tasks are avoided). In one variant, several tasks that do not depend on the order of completion can be offered to an operator at the same time. In this case, the order of completion is left to the operator. If he/she does not complete all tasks (e.g. because he/she leaves the process, e.g. at a shift change), the tasks not completed by this operator are taken into account by the system when creating the task list of the other operators and, if necessary, new operators.

Figure 8:
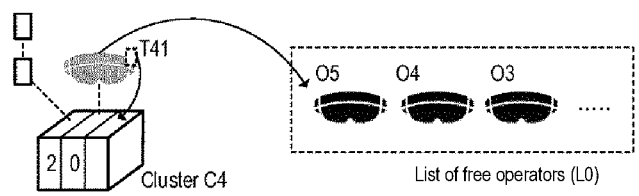
FIG. 8 illustrates by means of a schematic diagram the procedure for the execution of a certain task by the respective operator.
Figure 9:
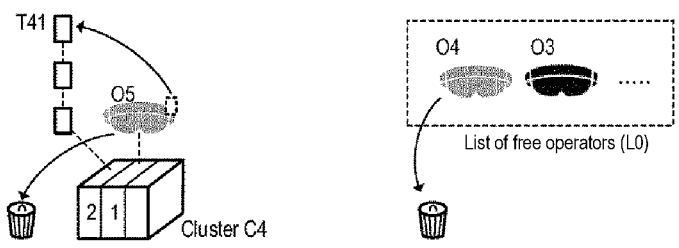
FIG. 9 illustrates by means of a schematic diagram the procedure when an operator leaves the team.

FIG. 8 schematically illustrates a situation in which an operator has confirmed the completion of a task or the completion of the last task of a group of tasks (if several tasks have been assigned to the operator). This confirmation is usually made by the operator e.g. manually at his AR terminal (e.g. by pressing a virtual key in the field of view of the AR terminal, by pressing a real key at the AR terminal, via Bluetooth controller, voice control, etc.). In this case, the active task (e.g. task 41) is deleted from the list L2 of active tasks and added to the list L3 of completed tasks, and the relevant operator (e.g. operator O5) is added back to the list L0 of free operators. There are situations where an active operator leaves (or must leave) his workstation without completing (or being able to complete) the task assigned to him/her. When leaving the workstation, the AR terminal of the relevant operator is logged off from server 11 (unregistered). This logout can take place automatically (e.g. if the WLAN connection between AR terminal and access point is interrupted) or can be initiated manually by the operator or another person (e.g. via the Administrator Terminal 40 or an AR terminal). This situation is illustrated in diagram A from FIG. 9. In the example shown, operator O5 has logged off his AR terminal from server 11. The active, uncompleted task (e.g. Task T41) and the relevant operator O5 are removed from the list L2 of active tasks and the task is re-included in the list L1 of uncompleted tasks and can be assigned to another operator (see FIG. 7, diagram C). If the AR terminal of a free operator (e.g. O4) is logged off, it is removed from the list L0 of free operators.

Some aspects of the execution examples described here are summarized below (see FIG. 1-9). It should be noted, however, that this is not a complete list, but merely an exemplary list. A system to support teamwork using augmented reality (AR) is described. According to the examples described here, the system has a production server (see FIG. 1) that is designed to store the three-dimensional geometry of at least one part of a machine (see FIG. 2). In addition, a large number of tasks are stored, whereby each task can be assigned to a position in the space at which the respective task is to be completed, as well as position-related information regarding the completion of the task (cf. FIG. 4, Diagrams A and B). The system also has a large number of AR terminals (see FIG. 1) connected to the production server via a computer network. Each AR terminal can be assigned to one person of a team. The production server is designed to dynamically generate a "recipe" for the execution of the process (and to adapt it if necessary), whereby each person of the team (e.g. taking into account the skill level of the person) is assigned a certain task or offered a group (cluster) of tasks (cf. FIG. 7) by displaying the associated position-related information on the AR terminal of the respective person at the position assigned to the respective task in space (cf. FIG. 4, diagram B). Depending on the implementation, the position of the individual operators can be recorded step by step (i.e. during a process) using the AR terminals and stored (e.g. together with the associated times and active tasks). This data can be used for a later data analysis or also for a real-time data analysis (Realtime Analytics) (see FIG. 1). For example, these data can be used to (partially) automatically optimize workflows (e.g. the assignment of tasks to clusters or the sequence of tasks in a cluster or the avoidance of collisions between two or more operators).

The production server can be further configured to mark any person in the team assigned or offered a task as busy and to mark the assigned task as active. These markings are made, for example, by adding the person and task to list L2 of active tasks (see FIG. 6). Furthermore, the production server can mark a task as completed when the (employed) person to whom this task is assigned confirms the completion of the task via their AR terminal. This marking is done, for example, by adding the task in to list L3 of completed tasks (see FIG. 6).

The marking of a task as active is deleted again (without marking the task as completed) if the AR terminal of the person to whom the task is assigned is logged off from the production server without the person having previously confirmed completion of the task. The marking can be deleted, for example, by adding the task in question to the list L1 of uncompleted tasks (see FIG. 6). A person whose AR terminal has been logged off from the production server is no longer available for the assignment of further tasks.

The production server can assign persons to whom no task is currently assigned (list L0 of free operators, see FIG. 7) as long as new (uncompleted) tasks are assigned, as long as there are tasks that are neither marked as active nor as completed and as long as there are no collisions due to the assignment (overlapping of the work areas of two operators due to spatially close tasks). An additional person with an additional AR terminal can be added to the team by registering the additional AR terminal from the production server (see FIG. 7, Diagram A). In the examples described here, the team members are identified or differentiated by the production server on the basis of an identifier of the AR terminals assigned to them.

Each task of a process (e.g. retooling or retooling a production line or part thereof) can be assigned to a cluster, and each task can either be marked as uncompleted, active, or completed (see FIGS. 5 and 6). When assigning tasks to people, the production server can prioritize them. For example, tasks can first be considered in the cluster that contains the most uncompleted tasks and the least active tasks, provided that no collisions with other operators are to be expected. For this purpose, the lists of tasks of each operator can be generated or updated step by step with the process, taking into account defined boundary conditions—such as the skill level required for a particular task or dependencies between tasks (logical dependencies or spatial dependencies).

The invention claimed is:

1. A computerized team work support system comprising:
a production server adapted to store a three-dimensional geometry of at least part of one or more machines on a production line and a plurality of tasks for a process, each respective task having a position in a room at which the respective task is to be completed, and position-related information relating to an execution of the respective task; and
a plurality of user terminals connected to the production server via a computer network, each of the plurality of user terminals associated with a person of a team,
wherein the production server is further configured to dynamically generate a list of tasks, dynamically update the list of tasks for the process to be handled by the team based on a completed task of the list of tasks and a number of persons of the team, and assign the respective task to each person of the team from the list of tasks, and the plurality of tasks are associated position-related information on the plurality of user terminals of the person concerned represent,
wherein assigning the list of tasks takes place dynamically depending on the number of persons and process parameters of a previously executed process on the production line and is updated when the number of persons changes or the process parameters were achieved during the previously executed process,
wherein each of the plurality of tasks is assigned to a cluster based on logical or spatial dependencies or a sequence of tasks to be completed, and
wherein the process includes setting up or retooling the one or more machines on the production line.

2. The system according to claim 1, wherein the plurality of user terminals is adapted to the position-related information associated with the respective task at the position to represent space.

3. The system according to claim 1, wherein the production server is further adapted to assign each person the respective task, wherein the respective task is a single task or a group of tasks, and wherein a location takes into account a skill level of the person.

4. The system according to claim 1, wherein the production server is further configured to mark each person of the team to whom the production server assigns the respective task as busy and to mark the respective task assigned as active.

5. The system according to claim 4, wherein the production server is further adapted to mark the respective task as done if the person to whom the respective task is assigned completes an execution of the respective task via its user terminal confirmed.

6. The system according to claim 5, wherein the production server is further adapted to remove a tag of the respective task as active without marking it as done, if the user terminal is assigned to the person to which the respective task is assigned, is deregistered from the production server without the person confirming completion of the respective task.

7. The system according to claim 6, wherein the production server is further adapted to assign persons who are not currently assigned to the respective task as long as new tasks from the plurality of tasks, as long as the plurality of tasks contains the new tasks that does not have a marking, wherein the marking is selected from a group consisting of active and completed.

8. The system according to claim 1, wherein the production server is further adapted to add an additional person with an additional user terminal to the team by registering the additional user terminal with the production server.

9. The system according to claim 1, wherein the production server is further adapted to identify the person of the team on a basis of an identifier of their associated user terminals.

10. The system according to claim 1, wherein each respective task of the cluster is marked as a marking, wherein the marking is selected from a group consisting of pending, active and done.

11. The system according to claim 10, wherein the production server is further adapted to, when assigning each of the plurality of tasks to the person, first to consider tasks in the cluster that comprises the most unfinished of the respective tasks and the least active of the respective tasks.

12. The system according to claim 1, wherein the plurality of user terminals are augmented reality (AR) terminals, each of the augmented reality terminals having a stereoscopic head-up display and one or more sensors that three-dimensionally capture a geometry of an environment.

13. The system according to claim 12, wherein at least a part of the AR terminals and the production server are adapted to create, in an authoring mode and from a sensor data, a 3D model of the environment which corresponds to the plurality of tasks and contains associated positions.

14. A computerized method for supporting teamwork, the method comprising:
   storing data on a production server, the data includes a three-dimensional geometry of at least part of a machine on a production line and a plurality of tasks for a process, each respective task having a position in a room where the respective task is to be done, and position-related information concerning an execution of the respective task are assigned;
   registering a plurality of user terminals, which are connected to the production server via a computer network, to the production server, each of the plurality of user terminals of a person is assigned to a team;
   dynamically generating a list of tasks for the process to be handled by the team;
   dynamically updating the list of tasks based on a completed task of the list of tasks and a number of persons of the team; and
   assigning the respective task or a group of tasks from the plurality of tasks to the person of the team, each of the plurality of tasks, assigned to the respective task an associated position-related information on a respective user terminal, of the plurality of user terminals, of the person concerned is displayed,
   wherein assigning the list of tasks takes place dynamically depending on the number of persons and process parameters of a previously executed process on the production line and is updated when the number of persons changes or the process parameters are achieved during the previously executed process,
   wherein each of the plurality of tasks is assigned to a cluster based on logical or spatial dependencies or a sequence of tasks to be completed, and
   wherein the process includes setting up or retooling the machine on the production line.

15. The method according to claim 14, wherein the respective user terminal represents a location-related information associated with the respective task at the position assigned to the respective task.

16. The method according to claim 14, wherein the respective user terminal displays the respective task assigned to the person associated with the respective user terminal and, if a user has confirmed the respective task, that of the respective task, the associated position-related information at the respective task an associated position in space represents.

17. The method of claim 14, wherein assigning the respective task from the plurality of tasks comprises:
   assigning the group of tasks from the plurality of tasks to the person of the team, wherein the respective user terminal of the person enables a selection of the respective task from the group of tasks; and
   representing the position-related information associated with the respective task selected by the person on the respective user terminal of the person concerned,
   wherein the plurality of tasks associated with the plurality of tasks in space and associated positional information is stored in a database of the production server.

* * * * *